United States Patent [19]

Inoue et al.

[11] Patent Number: 4,777,007
[45] Date of Patent: Oct. 11, 1988

[54] FAST BREEDER

[75] Inventors: Kotaro Inoue, Ibaraki; Katsuyuki Kawashima, Hitachi; Atsushi Zukeran, Mito, all of Japan

[73] Assignee: Hitachi, Ltd., Tokyo, Japan

[21] Appl. No.: 339,894

[22] Filed: Jan. 18, 1982

[30] Foreign Application Priority Data

Jan. 19, 1981 [JP] Japan .................................. 61-5013

[51] Int. Cl.⁴ ............................................ G21C 1/02
[52] U.S. Cl. ..................................... 376/173; 376/349
[58] Field of Search ...................... 376/172, 173, 349

[56] References Cited

U.S. PATENT DOCUMENTS 3,658,643  4/1972  Spenke ................................ 376/349
3,660,227  5/1972  Ackroyd et al. .................... 376/173

FOREIGN PATENT DOCUMENTS 0142484  11/1979  Japan .................................. 376/173
1299038  12/1972  United Kingdom ................ 376/172

OTHER PUBLICATIONS

ANS Trans, vol. 33, 1979, pp. 862, 863.
COO-2250-5 (Mitne-157), 1/74, "Evaluation of the Parfait Blanket Concept for Fast Breeder Reactors", Ducat et al.

Primary Examiner—Harvey E. Behrend
Attorney, Agent, or Firm—Antonelli, Terry & Wands

[57] ABSTRACT

A fast breeder incorporating a core having a driver core region containing an enriched fissile material, an external blanket region surrounding the core region and containing a fertile material and an internal blanket region disposed within the driver core region and containing a fertile material. The internal blanket region has a thickness or axial height greater at the central portion thereof than at the peripheral portion thereof. The peripheral end of the internal blanket region opposes to the inner peripheral surface of the external radial blanket region with a portion of the core region interposed therebetween.

14 Claims, 8 Drawing Sheets

RATIO OF DIAMETER OF INTERNAL BLANKET REGION TO DIAMETER OF DRIVER CORE REGION ($d_1/D_2$)

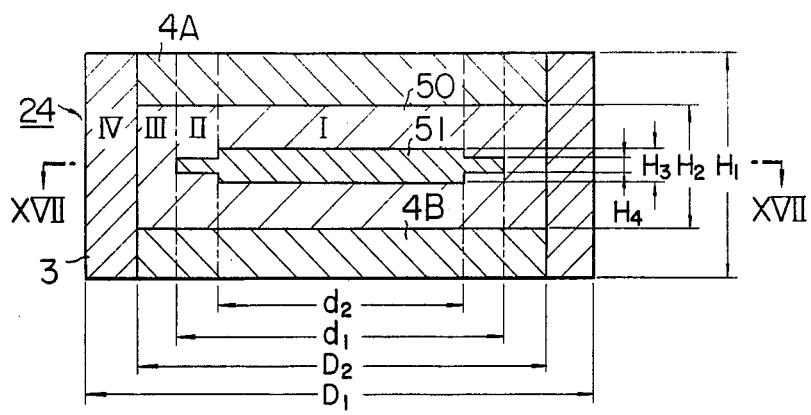
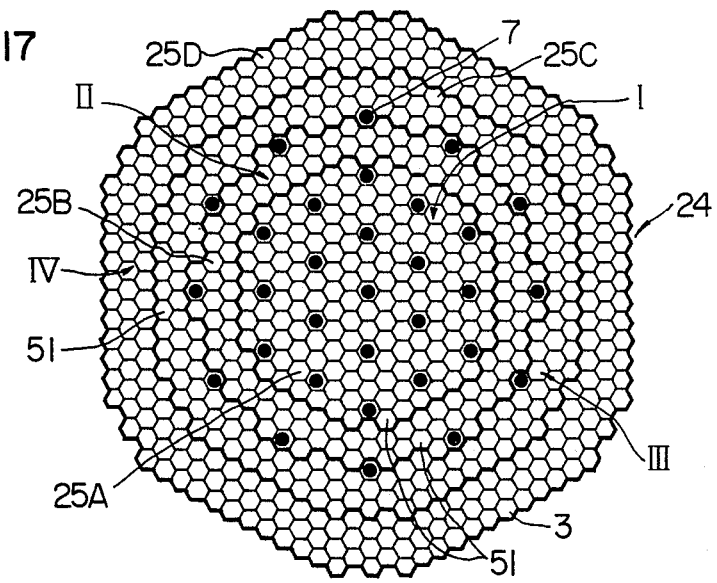
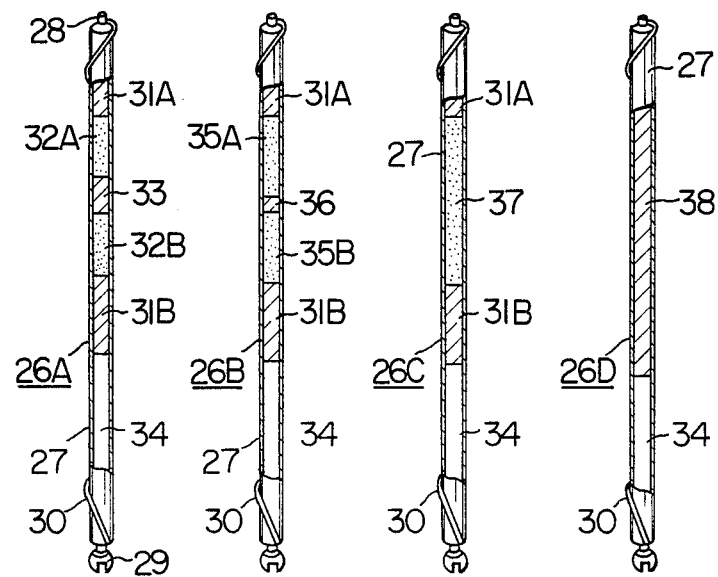

FAST BREEDER

BACKGROUND OF THE INVENTION

The present invention relates to a fast breeder and, more particularly, to a fast breeder having an axially heterogeneous core, capable of shortening the fuel doubling time.

The fast breeder is a nuclear reactor of the type in which fast neutrons produced as a result of fission in the reactor core are absorbed by a fertile material to produce new fissile material in the reactor core. Namely, in the fast breeder, the new fissile material is produced at a rate higher than the rate of consumption of the fissile material by fission. It is possible to make an efficient use of the nuclear fuel by this production of the new fissile material, i.e. by the breeding.

The core of the fast breeder usually has a columnar construction consisting of a driver core region containing the fissile material and a blanket region surrounding the driver core region and consisting mainly of the fertile material. The blanket region has a radial blanket region which surrounds the outer periphery of the driver core region and axial blanket regions which are disposed at both axial ends of the driver core region. The fissile material residing in the core region is mainly plutonium 239, while the fertile material in the blanket region consists mainly of uranium 238. The uranium 238 absorbs the fast neutrons produced mainly as a result of the fission of the plutonium 239 and is transformed into plutonium 239.

The driver core region is a region in which the fuels consisting of enriched fissional material are contained. The blanket region is a region in which the fuels consisting mainly, at least when initial charging, of fertile material such as depleted uranium, natural uranium or the like material are contained.

The most popular construction of the core generally referred to as "homogeneous core" has the driver core region which is divided into an inner core region and an outer core region which are concentric with each other. In the reactor core having the core region divided into concentric regions as stated above, the degree of enrichment, i.e. the ratio of the amount of the fissile maeterial to the sum of the amount of the fissile product and the amount of the fertile material, is greater in the outer core region than in the inner core region.

A reactor core called Parfait type core, employing a flat columnar inner blanket region having a uniform thickness disposed at the axially central portion of the driver core region of a fast breeder, has been proposed by G. A. DUCAT et al., in "Evaluation of the Parfait Blanket Concept for Fast Breeder Reactors", COO-2250-5, MITNE-157, Massachusettes Institute of Technology, January 1974.

Also, K. Inoue et al. have proposed a core construction for fast breeders, in which an inner blanket region is disposed at the axial central portion of the driver core region as in the case of the Parfait type core, wherein the axial thickness of the inner blanket region is made greater at the peripheral portion of the inner blanket region than at the central portion of the same ("A Fast Breeder Core with Internal Blanket", American Nuclear Society Transactions, Vol. 33, P862 to 863, 1979). The outer surface of the inner blanket region of this reactor core is in contact with the inner surface of the radial blanket region.

SUMMARY OF THE INVENTION

An object of the invention is to provide a fast breeder improved to realize a flat power distribution over the core region.

Another object of the invention is to shorten the doubling time.

Still another object of the invention is to simplify the construction of the core which can shorten the doubling time.

To these ends, according to one aspect of the invention, the axial thickness of the internal blanket is made greater at the central portion of the internal blanket than at the peripheral portion of the same, and the outer peripheral ends of the internal blanket are made to oppose to the external blanket region with parts of the driver core region interposed therebetween.

According to another aspect of the invention, a reactor core is composed of a first section having an internal blanket region disposed between a pair of driver core regions which are arranged in the axial direction, a second section having an internal blanket region having an axial thickness smaller than that of the internal blanket region of the first section and interposed between a pair of driver core regions which are arranged in the axial direction so as to surround the first region, and a third section having driver core region surrounding the second section but having no internal blanket.

According to still another aspect of the invention, a reactor core is composed of a first zone constituted by a plurality of first fuel assemblies each being provided at its axial upper and lower ends with external blanket regions which sandwich therebetween a pair of driver core regions opposing to each other with an internal blanket region therebetween, a second zone surrounding the first zone and constituted by a plurality of second fuel assemblies each having external and internal blanket regions and driver core regions arranged in the same manner as the first fuel assembly, the axial thickness of the internal blanket region in the second fuel assembly being smaller than the axial thickness of the internal blanket region in the first fuel assembly, and a third zone surrounding the second zone and composed of a plurality of third fuel assemblies each being provided at its axial upper and lower ends with external blanket regions and a core region interposed between the external blanket regions, the third fuel assembly containing no internal blanket region.

These and other objects, features and advantages of the invention will become clear from the following description of the preferred embodiments taken in conjunction with the accompanying drawings.

BRIEF DESCRIPTION OF THE DRAWINGS

FIG. 16 is a schematic vertical sectional view of an example of the hamburger type core for use in the fast breeder as shown in FIG. 14;

FIG. 17 is a sectional view taken along the lines XVII—XVII in FIGS. 14 and 16;

FIG. 18A is a vertical sectional view of a fuel pin constituting the fuel assembly for loading the first layer of the hamburger type core shown in FIG. 16;

FIG. 18B is a vertical sectional view of a fuel pin constituting the fuel assembly for loading the second layer of the hamburger type core shown in FIG. 16;

FIG. 18C is a vertical sectional view of a fuel pin constituting the fuel assembly for loading the third layer of the hamburger type core shown in FIG. 16;

FIG. 18D is a vertical sectional view of a fuel pin constituting the fuel assembly for loading the fourth layer of the hamburger type core shown in FIG. 16;

DESCRIPTION OF THE PREFERRED EMBODIMENTS

The present invention has been accomplished as a result of studies on the characteristics of cores of various fast breeders proposed hitherto.

Figure 1:
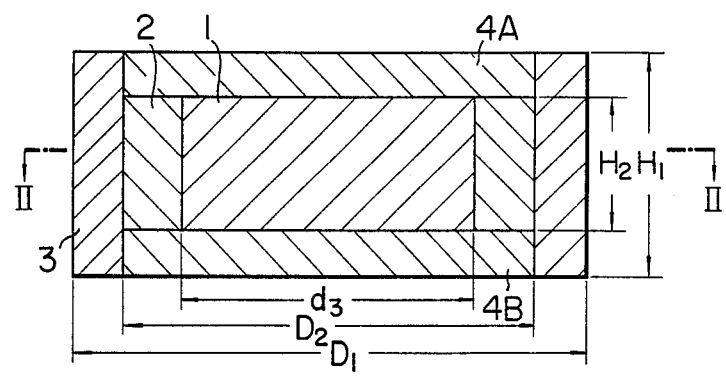
FIG. 1 is a schematic vertical sectional view of a conventional homogeneous core of a fast breeder.
Figure 2:
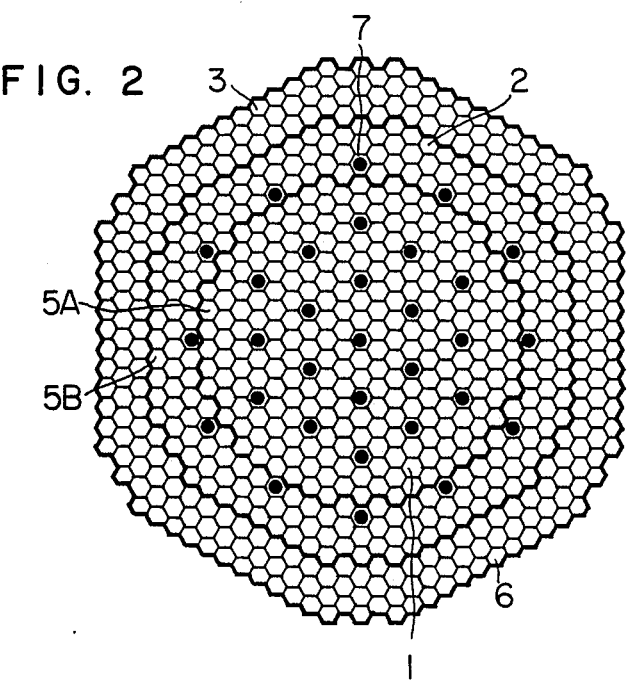
FIG. 2 is a sectional view of the homogeneous core taken along the line II—II of FIG. 1.

Referring to FIGS. 1 and 2 showing the conventional homogeneous core of a fast breeder, the driver core region is divided into an inner core region and an outer core region. The outer core region 2 surrounds the inner core region 1 which has a hexagonal cross-section. A radial blanket region 3 is disposed to surround the outer core region 2, while axial blanket regions 4A and 4B are disposed at the upper side and lower side of the driver core region, respectively. Each of fuel assemblies 5A and 5B to be mounted in the core region is charged at its both ends with natural uranium or depleted uranium which forms the axial blanket regions 4A and 4B. The fuel assembly 5B constituting the outer core region has a degree of enhancement of plutonium 239 greater than that of the fuel assembly 5A constituting the inner core region. Each of fuel assemblies 6 for loading the radial blanket region 3 is charged with natural or depleted uranium over its entire length. A reference numeral 7 designates control rods.

Figure 3:
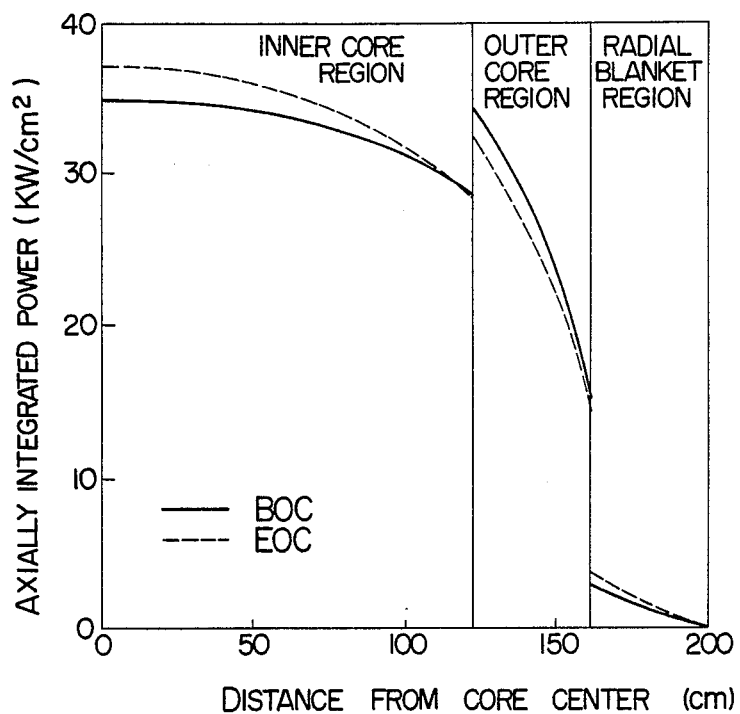
FIG. 3 is a characteristic diagram showing the radial power distribution in a homogeneous core as shown in FIG. 1.

In this homogeneous core, the reduction of reactivity in the core region due to burnup is relatively large as compared with the reactivity controllable by the control rods, so that the period of burnup of fuel assembly is limited short. In consequence, it is necessary to renew several tens of percents of the fuel assemblies in the core region almost every year. It is possible to prolong the burnup period by increasing the surplus reactivity in the core region at the initial period of burning. In such a case, however, it is necessary to control also the surplus reactivity, requiring much more control rods or control rods having large control rod worth into the core. This inconveniently causes a large distortion of the radial power distribution (axially integrated power) in the core region. In FIG. 3, the full-line curve shows the power distribution in the beginning of burnup cycle (referred to as "BOC", hereinafter), while the broken-line curve shows the power distribution in the end of the burnup cycle (referred to as "EOC", hereinunder). The power distribution curves as shown in FIG. 3 have been obtained with a reactor core construction as shown in FIG. 1, wherein the height $H_1$ and the height $H_2$ are 170 cm and 100 cm, respectively, while the diameters $D_1$, $D_2$ and $d_3$ are 405 cm, 325 cm and 243 cm, respectively.

Figure 4:
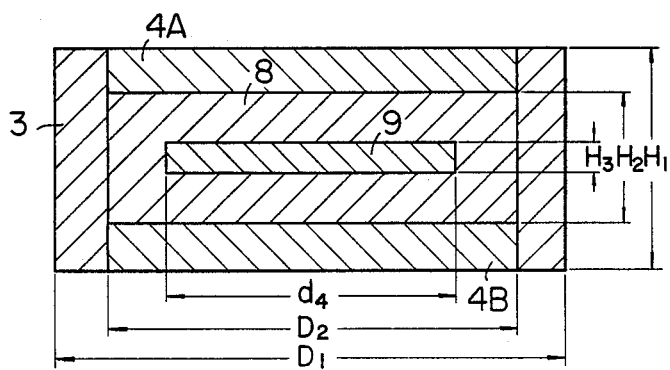
FIG. 4 is a schematic vertical sectional view of a conventional Parfait type core of a fast breeder.

FIG. 4 illustrates the construction of a Parfait type core which is a kind of axially heterogeneous core. A driver core region 8 is surrounded by an external blanket region which consists of a radial blanket region 3 and both axial end blanket regions 4A and 4B. The driver core region 8 has a uniform degree of enrichment of plutonium 239. An internal blanket region 9 consisting of natural uranium or depleted uranium is disposed at the axially central portion of the driver core region 8. The heights $H_1$, $H_2$ and the diameters $D_1$, $D_2$ are identical to those of the homogeneous core explained before. The internal blanket region 9 has a flat columnar shape with a hexagonal cross-section. The diameter $d_4$ and the height $H_3$ are selected to be 229 cm and 25 cm, respectively. The internal blanket region 9 is disposed concentrically with the driver core region 8. The degree of enrichment of the plutonium 239 in the Parfait type core is greater than that in the homogeneous core, due to the presence of the internal blanket region 9.

The presence of the internal blanket region 9 causes also an increase in the mean neutron energy in the driver core region 8 of the Parfait type core. Therefore, in the driver core region 8, the rate of the neutron fission reaction of plutonium 239 to the absorption reaction of plutonium 239 is decreased. This in turn causes an increase in number of neutrons produced for each absorbed neutron. On the other hand, the density of atoms of fertile material (mainly uranium 238) in the internal blanket region 9 is greater than that in the driver core region 8. In addition, the mean neutron energy in the internal blanket region 9 is lower than that in the core region 8. This leads to an increase in the rate of neutron capture of the fertile material, which decreases the rate of change of reactivity during burnup.

Figure 5:
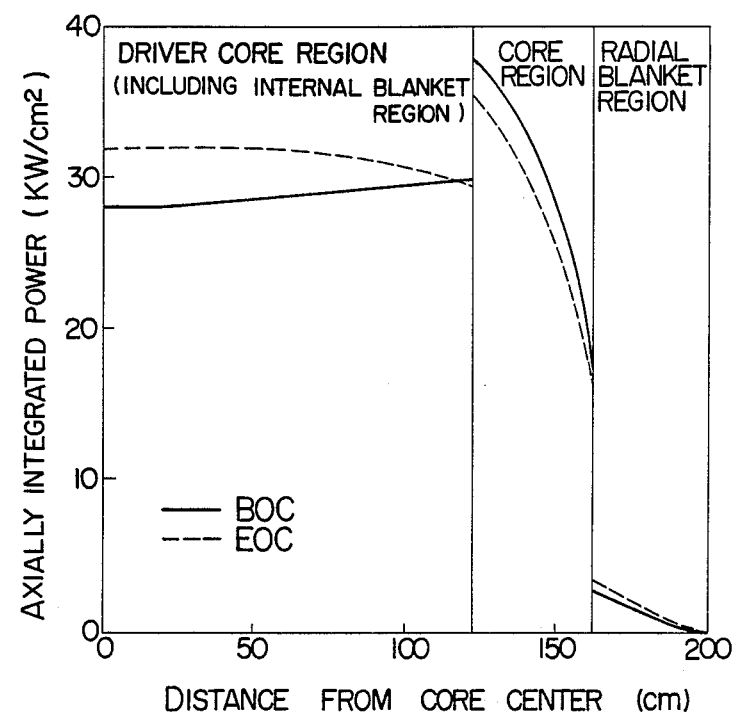
FIG. 5 is a characteristic diagram showing the radial power distribution in the Parfait type core as shown in FIG. 4.

Thus, the Parfait type core is able to increase the breeding ratio in comparison with the homogeneous core, so that the doubling time is shortened. FIG. 5 shows the radial power distribution (axially integrated power) in the Parfait type core having the size stated before. The flattening in the power distribution of the Parfait type core is same degree as that of the homogeneous core shown in FIG. 1.

On the other hand, however, the Parfait type core suffers a problem of a large swing of the power during burnup, i.e. between the BOC and EOC. Namely, as the fast breeder operates long, the plutonium 239 in the internal blanket region 9 is increased to cause a drastic rise of the axially integrated power at the radially inner region of the core. On the other hand, the power is drastically lowered in the portion of the driver core region 8 between the internal blanket region 9 and the radial blanket region 3, as the fast breeder operates long. This is attributable to the consumption of plutonium 239 in the above-mentioned portion of the driver core region 8.

Figure 6:
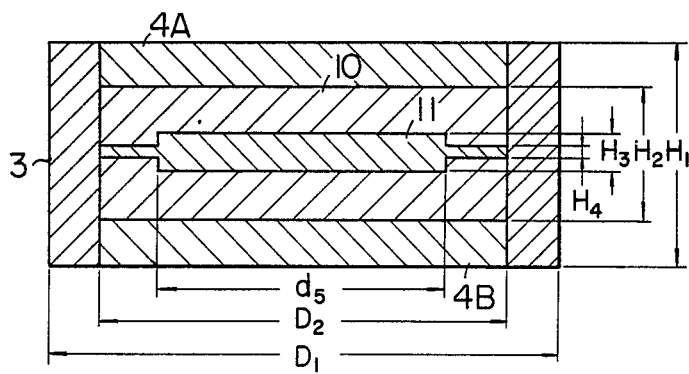
FIG. 6 is a schematic vertical sectional view of a conventional axially heterogeneous core of a fast breeder.

FIG. 6 illustrates a core of a fast breeder disclosed in American Nuclear Society Transactions Vol. 33, pp 862 and 863. In this case, an internal blanket region 11 is disposed at the axially central portion of the driver core region 10 surrounded by the external blanket region. The outer peripheral surface of the internal blanket region 11 is in contact with the inner peripheral surface of the axial blanket region 3. The axial thickness $H_4$ of the peripheral portion ($D_2$–$d_5$) of the internal blanket region 11 is smaller than the axial thickness $H_3$ of the central portion ($d_5$) of the same. The diameters $D_2$, $d_5$ and the heights $H_3$, $H_4$ of the internal blanket region 11 are selected to be 325 cm, 229 cm and 30 cm, 10 cm, respectively. The diameter $D_1$ and the heights $H_1$, $H_2$ are equal to those of the cores described hereinbefore.

Figure 7:
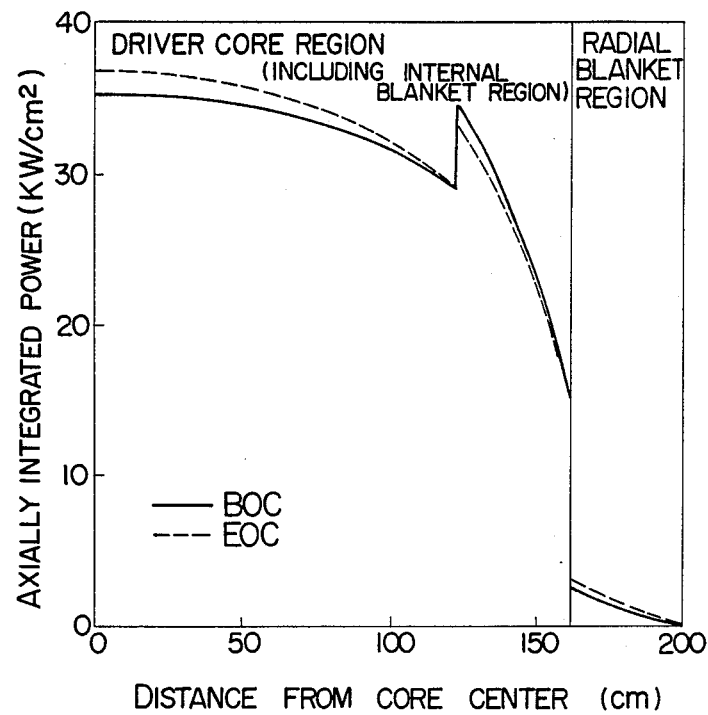
FIG. 7 is a characteristic diagram showing the radial power distribution in the axially heterogeneous core as shown in FIG. 6.

FIG. 7 shows the radial power distribution (axially integrated power) of the core shown in FIG. 6. In this type of cores, it is possible to reduce a swing of the power between BOC and EDC while achieving a flattening of the power distribution. The restraint of the swing of the power is attained by positioning a thin blanket region reaching the inner peripheral surface of the axial blanket region 3, in the portion of the driver core region 8 around the internal blanket region 9 of the Parfait type core. Namely, since plutonium 239 is generated also in the thin portion of the internal blanket region 11 as the fast breeder operates long, the undesirable drastic reduction of power in the peripheral portion of the driver core region 10, which takes place inevitably in the Parfait type core as the fast breeder operates long, is avoided advantageously.

The core as shown in FIG. 6 has a doubling time of 18.4 years, neglecting the out-of-pile inventory and reprocessing loss of the fuel.

The shortening of the doubling time, which is a quantitative reference of the breeding as well as the breeding ratio, is the most important key to the improvement in the fast breeder. While the breeding ratio is the ratio of the amount of newly produced fissile material to the amount of consumption of the fissile material, the doubling time is the time length required for the regeneration of the fissile material of an amount equal to the amount of fuel initially loaded in the core of the fast breeder. Thus, it is preferable to make the breeding ratio as great as possible. To the contrary, the doubling time is made preferably as short as possible.

The present inventors have made various studies to provide a core structure which can shorten the doubling time while maintaining the advantage of the core shown in FIG. 6 which permits the restraint of swing of the power.

The doubling time is in inverse proportion to the specific power, i.e. to the power per unit amount of loading of fuel. The doubling time, therefore, can be shortened by flattening the power distribution by restraining the reduction of power in the peripheral portion of the driver core region. With this knowledge, the present inventors have made studies to determine how to prevent the reduction of power in the peripheral portion of the driver core region 10. The simplest way to prevent the power reduction in this region is to increase the degree of enrichment of plutonium 239 progressively toward the radially outer side in the annular portion ($D_2$–$d_5$) in the core region 10 shown in FIG. 6. This way, however, necessitates the production of more than two classes of fuel pellets having different degrees of enrichment of plutonium 239, resulting in a complicated process of production of the fuel pellets. The power, however, becomes higher as the fission of the fissile material such as plutonium 239 becomes more vigorous, i.e. as the amount of the fissile material is increased.

Based on this matter, the present inventors have determined that by means of, in a peripheral portion of the internal blanket region 11 of the core shown in FIG. 6, decreasing a thickness of internal blanket region progressively toward the outside and, in addition, by means of locating an outer peripheral surface of the internal blanket region 11 to the inside of an inner peripheral surface of the radial blanket region 3 and, further, by means of interposing the driver core region 10 between the aforesaid outer and inner peripheral surface, it is possible to increase the thickness of the driver core region progressively toward the outside and thus, in other words, to increase extremely the amount of fissile material contained in the peripheral portion of the driver core region. To surround the thin peripheral portion of the internal blanket region with the driver core region serves to eliminate the thin portion of the internal blanket region 11 having small fissile material content, the thin portion being located in the vicinity of outer peripheral surface of the driver core region 10 in the core shown in FIG. 6 and being found to cause reduction of power in the peripheral portion of the driver core region 10. It is thus possible to increase the power in the driver core region even though the fissile material in the core region has only one class of degree of enrichment. Particularly, the presence of a part of the driver core region between the outer peripheral surface of this peripheral portion of the internal blanket region 11 and the inner peripheral surface of the radial blanket region 3 permits a remarkable shortening of the doubling time, as will be explained later.

An example of the core of the fast breeder in accordance with the invention, arranged on the basis of the above-explained concept, will be described hereinunder with specific reference to FIGS. 8 and 9. A core region 12 is surrounded by an external blanket region consisting of a radial blanket region 3 and axial blanket regions 4A and 4B. A horizontally extending internal blanket region 13 is disposed in the driver core region 12 at the axially central portion of the driver core region 12. The axial thickness of the internal blanket region 13 is smaller in its peripheral portion than in its central portion. This change of axial thickness is realized not continuously but in a stepped manner by varying the constructions of the fuel assemblies or fuel pins. The internal blanket region 13 has a flat columnar shape with its thickness reduced at the peripheral portion thereof. The driver core region 12 has an annular portion surrounding the internal blanket region 13. This portion occupies the space between the internal blanket region 13 and the radial blanket region 3. In other words, the radially outer extremity of the internal blanket region 13 opposes to the radial blanket region 3 with the annular portion of the driver core region 12 interposed therebetween. Thus, the axially heterogeneous core, i.e. the hamburger core, in accordance with the invention is divided into four layers in the horizontal direction. Namely, the first layer I is disposed at the center of the core, and second, third and fourth layers II, III and IV are arranged from radially inner side toward the outer side in the mentioned order concentrically with the first layer I. The first layer I having a columnar shape of a diameter $d_2$ is provided at its upper and lower ends with first blanket regions which constitute axial blanket regions 4A and 4B. In the first layer I, a pair of axially arranged driver core regions are formed between these first blanket regions. Also, a second blanket region constituting the horizontally extending internal blanket region 13 is disposed between these driver core regions. The second layer II has an annular form of a width represented by $(d_1-d_2)/2$. The construction of this second layer II is identical to that of the first layer I except that the axial thickness of the second blanket region constituting the horizontally extending internal blanket region 13 is smaller than that in the first layer I. The outer peripheral surface of the second blanket region in the first layer I is disposed adjacent to the inner peripheral surface of the second blanket region of the second layer II. The third layer III has an annular form of a width represented by $(D_2-d_1)/2$ and contains no second blanket region. Namely, the third layer III is composed of the first blanket regions disposed at the axial upper and lower ends, and a driver core region disposed between these first blanket regions. The fourth layer IV has an annular form of a width represented by $(D_1-D_2)/2$. This layer IV is the radial blanket region 3 so that it consists of the blanket region over the entire axial length thereof.

In this hamburger type core, the radial blanket region 3, axial blanket regions 4A, 4B and the internal blanket region 13 contains natural uranium or depleted uranium rich in uranium 238 as the fertile material. On the other hand, the driver core region 12 contains $PuO_2-UO_2$. The degree of enrichment of the fissile material such as plutonium 239 is uniform in this core region.

Figure 10:
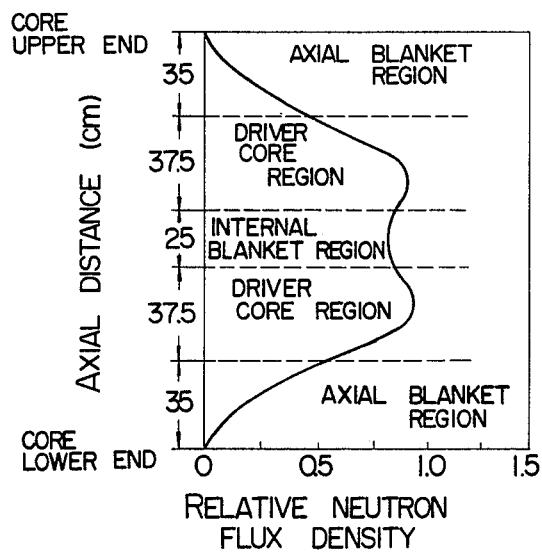
FIG. 10 is a characteristic diagram showing the axial distribution of neutron flux density in the hamburger type core as shown in FIG. 8.
Figure 11:
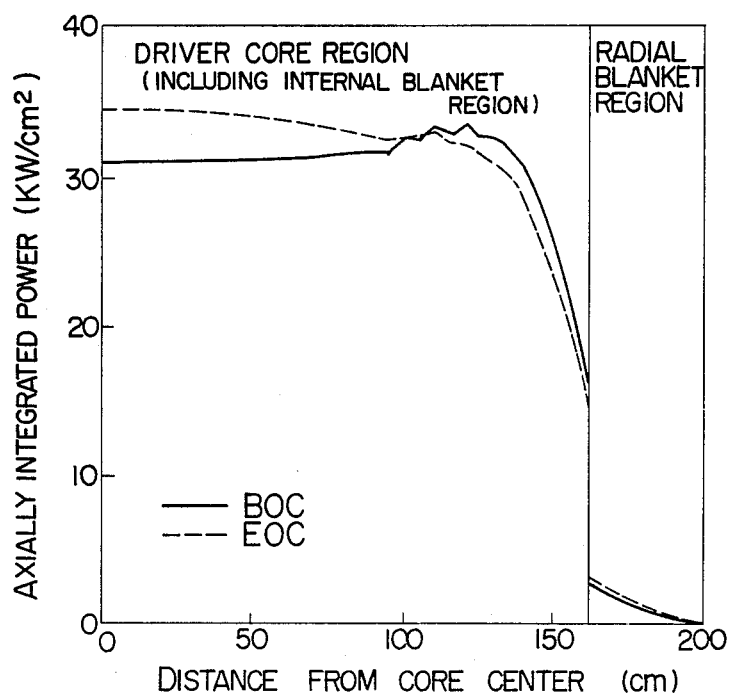
FIG. 11 is a characteristic diagram showing the radial power distribution in the hamburger type core as shown in FIG. 8.

FIGS. 10 and 11 show, respectively, the axial neutron flux and radial power distributions in this hamburger type core. In the axial power distribution, there are peaks of the neutron flux density appearing in the portions of the driver core region 12 above and below the internal blanket region 12. Thus, this core has a uniform or flat distribution of the power (power is proportional to neutron flux density when material is uniform) in the axial direction. The radial power distribution also is flattened remarkably in this core, because the drop of the power in the peripheral portion of the core region 12 is suppressed by the provision of the second and third layers II and III. This is attributable to the facts that the axial thickness of the internal blanket region 13 is large at the central portion of the core region 12 where the density of neutron flux and, hence, the reaction rates are high, and small in the peripheral portion of the driver core region 12 where the density of the neutron flux and, hence, the reaction rates are low, and that there is a region having no fertile material in the vicinity of the outer peripheral surface of the driver core region 12 where the density of the high-energy neutron flux is specifically low.

The characteristics as shown in FIGS. 10 and 11 were obtained with the diameter $d_1$ of 275 cm and the height $H_3$ of 25 cm. The diameters $D_1$, $D_2$ and the heights $H_1$, $H_2$ are identical to those of the core shown in FIG. 1. As will be seen from FIG. 11 in comparison with FIG. 5, the power distribution is flat and the swing of the power is suppressed remarkably as compared with the Parfait type core, in this hamburger type core in accordance with the invention.

Figure 12:
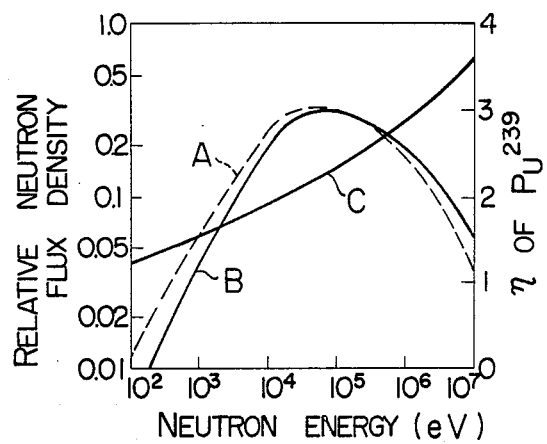
FIG. 12 is a characteristic diagram showing neutron flux density and $\eta$ of plutonium 239 in relation to the neutron energy.

An explanation will be made hereinunder as to the breeding action in the hamburger type core. The energy distribution of neutron in the homogeneous core is as shown by curve A in FIG. 12. In contrast, in the axially heterogeneous core having the internal blanket region 13 in the axial direction of the driver core region 12, the energy distribution is shifted toward the higher side as shown by curve B in FIG. 12, because the larger part of the neutrons in the driver core region 12 comes into the blanket regions 3, 4 and 13 becoming before decelerated upon collision with the atoms. As a result of the increase of mean neutron energy in the driver core region 12, the ratio of the neutron capture reaction to the fission reaction of the fissile material such as plutonium 239 is decreased in the driver core region 12, so that the number $\eta$ of neutron produced per absorbed neutron is increased as will be seen from curve C in FIG. 12. In the internal blanket region 13, the density of atoms of the fertile material, e.g. uranium 238, is higher and the mean neutron energy is lower than that in the driver core region 12. Therefore, in the internal blanket region 13, the rate of fission reaction of the fertile material is reduced, while the rate of neutron capture reaction of the fertile material is increased, as compared with the driver core region 12. In the hamburger type core, the rate of leakage of neutrons to the radial blanket region 3 and the axial blanket regions 4A, 4B is increased due to the fact that the neutron flux density is high in the boundary between the driver core region 12 and the surrounding blanket regions, i.e. the radial blanket region 3 and the axial blanket regions 4A, 4B. In consequence, the neutron capture reaction and fission reaction of the fertile material in the external blanket region are enhanced remarkably. This variation of the reactions and the flattening of the power distribution in combination offer a remarkable improvement in the breeding performance, particularly a shortening of the doubling time.

Figure 8:
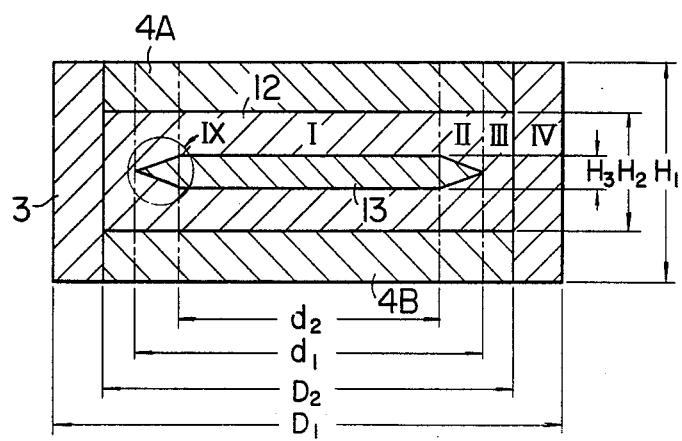
FIG. 8 is a schematic vertical sectional view of a hamberger type core for use in a fast breeder in accordance with a first embodiment of the invention.
Figure 9:
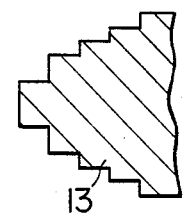
FIG. 9 is an enlarged view of the portion IX of FIG. 8.
Figure 13:
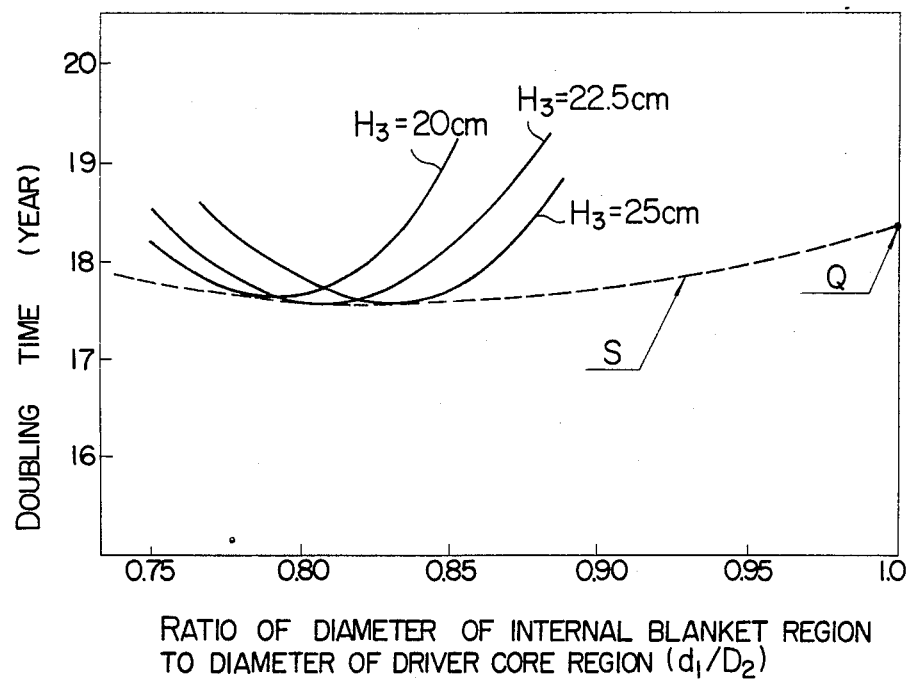
FIG. 13 is a characteristic diagram showing the relationship between the shape of the internal blanket and the doubling time in the hamburger type core as shown in FIG. 8.
Figure 14:
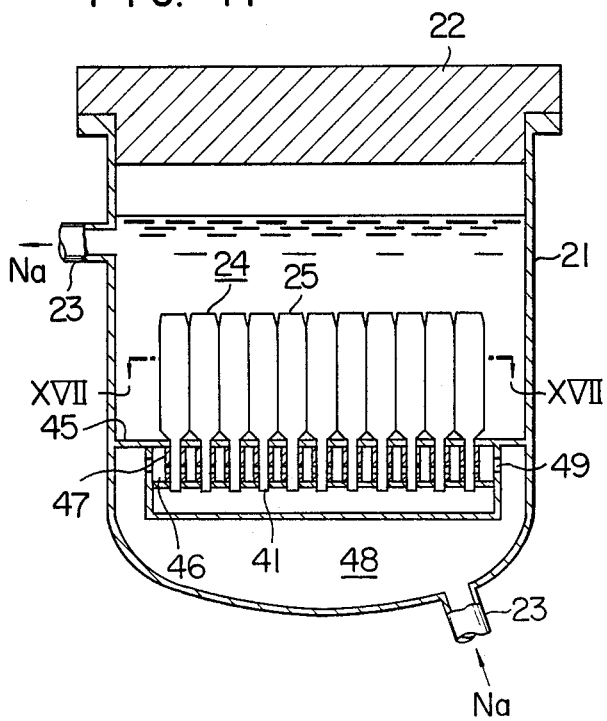
FIG. 14 is a vertical sectional view of a fast breeder constructed in accordance with an embodiment of the invention.

The relationship between the form of the internal blanket region 13 and the doubling time in the hamburger type core shown in FIG. 8 was examined, the result of which is shown in FIG. 13. The doubling time is varied in accordance with the change in the axial thickness $H_3$ of the internal blanket region 13 and also in accordance with the change in the ratio $d_1/D_2$ between the diameter $d_1$ of the internal blanket region 13 and the diameter $D_2$ of the driver core region 12 in the radial direction of the core. The curve S was obtained by connecting the points $d_1/D_2$ which minimizes the doubling time for respective values of the thickness $H_3$ of the internal blanket region 13. The point Q represents the doubling time as obtained when the ratio $d_1/D_2$ equals to 1, i.e. in the core shown in FIG. 6 wherein the thickness $H_3$ is 30 cm. Thus, in the core shown in FIG. 6, the doubling time is minimized when the thickness $H_3$ is 30 cm. It is possible to shorten the doubling time by providing a third layer III having no internal blanket region 13 at the outside of the second layer II as in the case of the hamburger type core. In order to obtain shorter doubling time in the hamburger type core, the ratio $d_1/D_2$ is preferably selected to fall between 0.76 and 0.9, while the thickness $H_3$ preferably ranges between about 20 and 25 cm. For information, the envelope curve of minimum doubling time in the Parfait type core is positioned above the envelope curve of minimum doubling time in the hamburger type core, i.e. the curve S.

The power distribution and the doubling time of the hamburger type core heretofore described have been obtained with the specification as shown in Table 1. The power distributions as shown in FIGS. 1, 4 and 6 also have been obtained with the specification as shown in Table 1. The characteristics of the hamburger type core of the invention in accordance with the specification in Table 1 are shown in Table 2, together with the characteristics of the preceding three types of known cores. The diameters $d_4$, $d_5$ and thicknesses $H_3$, $H_4$ in these three cores, i.e. the homogeneous core, Parfait type core and the core shown in FIG. 6, are equal to those of the cores mentioned before. More specifically, in a hamburger type core A, the thickness $H_3$ and the ratio $d_1/D_2$ are selected to be 22 cm and 0.81, respectively, whereas in another hamburger type core B, the thickness $H_3$ and the ratio $d_1/D_2$ are selected to be 22 cm and 0.79, respectively. The characteristics of the Parfait type core and the core shown in FIG. 6 are those which minimize the doubling time. As will be understood also from Table 2, the hamburger type core provides the shortest doubling time and the most flat power distribution, i.e. the smallest gross peaking factor, over other types of cores. The flat power distribution leads to the possibility of shortening the doubling time as mentioned later.

TABLE 1

| Specification of Hamburger Type Core | |
|---|---|
| Items | Specification |
| Heat output of reactor (MW) | 2500 |
| Dia./height of core region (cm) | 325/100 |
| Thickness of radial/axial blanket region (cm) | 40/35 |
| Volume of core region (l) | 8300 |
| Volume ratio of composition (fuel/coolant/structure) | 41.7/35.9/22.4 |
| Driver core, internal blanket and blanket, radial blanket | 50.5/31.1/18.4 |
| Fuel (core region/blanket region) | $PuO_2$—$UO_2$/depleted $UO_2$* |
| Smear density of fuel (theoretical density %) | |
| Driver core, axial blanket | 87 |
| Radial blanket | 91 |
| Period of fuel exchange (year) | 1 |
| Load factor (%) | 80 |
| Number of batches of fuel exchange | 3 |

*$U^{235}/(U^{235} + U^{238})$ is 0.2%

TABLE 2

| | Characteristics of cores | | | | |
|---|---|---|---|---|---|
| | Kinds of cores | | | | |
| | | | | Hamburger type cores of invention (FIG. 8) | |
| Items | Homogeneous core (FIG. 1) | Parfait type core (FIG. 4) | Core shown in FIG. 6 | A | B |
| 1. Breeding ratio (except $U^{235}$) | 1.26 | 1.28 | 1.28 | 1.28 | 1.28 |
| 2. Doubling time (neglecting out-of-pile inventory and reprocessing loss of fuel) (year) | 19.0 | 18.4 | 18.4 | 17.7 | 17.8 |
| 3. Amount of fissile material inventory (kg) | 3440 | 3565 | 3610 | 3520 | 3506 |
| 4. Burnup reactivity change (per year $\Delta k/k$ %) | −2.2 | −1.9 | −2.0 | −1.9 | −1.9 |
| 5. Gross power peaking factor (including internal blanket) | 1.51 | 1.51 | 1.49 | 1.43 | 1.43 |
| 6. Ratio of share of power in driver core (including power of internal blanket) (%) | 95.0 | 94.5 | 94.3 | 94.9 | 94.8 |
| 7. Power swing of fuel assembly due to burnup (ratio of sum of power variances to total power) (%) | 4.4 | 7.6 | 5.9 | 6.1 | 5.6 |

The hamburger type core has the smallest amount of loading of the fissile material among the three types of axially heterogeneous core having the internal blanket region. Furthermore, the swing of the power is much more suppressed in the hamburger type core than in the Parfait type core.

The fast breeder having the hamburger type core can achieve a highly economical use of the fuel, through improvement in the breeding performance, particularly the shortening of the doubling time. In addition, since the decrease in the reactivity due to burnup of the fuel is suppressed, the number of control rods to be mounted in the fast breeder can be decreased economically. Namely, in the hamburger type core, the decrease in the reactivity due to fuel burnup is suppressed as compared with homogeneous core, because the fissile material newly produced as a result of the breeding reaction is accumulated in the central portion of the core where the reactivity worth is high. In addition, the production of fuel pins is facilitated because only one class of degree of enrichment of fissile material is necessary.

In the hamburger type core in accordance with the invention, it is possible to decrease the maximum linear power density and the maximum degree of burnup of fuel pin, thanks to the remarkable flattening of the power distribution stated before. This in turn permits 14% increase in the thickness of the axial blanket region through reducing the height of the driver core region and the length of gas plenum in the fuel pin, keeping the total fuel length constant, without deteriorating the soundness of the fuel pin. The decrease of driver core length leads the reduction of fissile material and the increase in the thickness of the axial blanket region leads to an enhancement of the breeding ratio.

Hereinafter, an explanation will be made as to a preferred embodiment of the fast breeder incorporating the hamburger type core in which the height of the driver core region is decreased while the thickness of the axial blanket region is increased, with specific reference to FIGS. 14 to 18.

Figure 15:
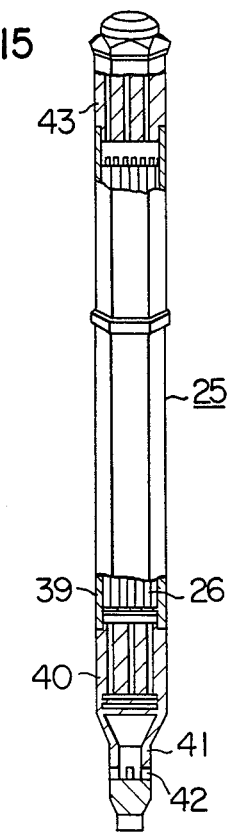
FIG. 15 illustrates a fuel assembly with which the core as shown in FIG. 14 is loaded.

The fast breeder of this embodiment has a reactor vessel 21 closed at its upper end by a rotary plug 22, a core 24 constituted by a number of fuel assemblies 25, and a core supporting plate 45 secured to the reactor vessel 21 and supporting the fuel assemblies 25. Each of the fuel assemblies 25 is supported by the core supporting plate 45 with an entrance nozzle 41 provided at the lower end thereof inserted in a flow rate adjusting tube 47 secured to the core supporting plate 45. FIG. 15 shows the construction of the fuel assembly 25. The fuel assembly 25 has a bell mouth tube 39 fitting at both ends thereof to a lower shield member 40 and an upper shield member 43, respectively, and a multiplicity of fuel pins 26 accommodated by the bell mouth tube 39 and secured to the lower shield member 40. The aforementioned entrance nozzle 41 having an opening 42 constituting an inlet for sodium as a coolant is provided at the lower side of the lower shield member 40.

The sodium as the coolant after being cooled by an intermediate heat exchanger (not shown) is introduced into the lower plenum 48 in the reactor vessel 21 through the inlet nozzle 23. Thereafter, the sodium flows into a high-pressure plenum 46 through an opening 49 and further into the fuel assembly 25 through an opening provided in the flow rate adjusting tube 47 and through the above-mentioned opening 42. The sodium is heated up to a high temperature by the fuel pins 26 as it flows through the fuel assembly 25. The thus heated sodium is discharged to the outside of the reactor vessel 21 through the outlet nozzle 23 and sent to the aforementioned intermediate heat exchanger.

FIG. 16 schematically shows the vertical section of the core 24 constituted by a multiplicity of fuel assemblies 25. A horizontally extending internal blanket region 51 exists at the axially central portion of a driver core region 50 which is surrounded by the external blanket region consisting of radial blanket region 3 and axial blanket regions 4A, 4B. The axial thickness of the internal blanket region 51 is changed in a stepped manner. Namely, the thickness $H_4$ of the peripheral portion of the internal blanket region 51 is smaller than the thickness $H_3$ of the central portion of the same. As in the case of the core shown in FIG. 8, the core of this fast breeder has a columnar first layer I having an internal blanket region, an annular second layer II having the internal blanket region continuous from that in the first layer, an annular third layer III having no internal blanket region and an annular fourth layer IV constituting the radial blanket region, the first to fourth layers being arranged concentrically. The outer peripheral surface of the internal blanket region 51 opposes to the radial blanket region 3 with a portion of the driver core region 50 interposed therebetween. In the core of the fast breeder of this embodiment, however, the internal blanket region in the second layer II has a uniform axial thickness along its radius, in contrast to the second layer II of the core shown in FIG. 8 in which the axial thickness of the internal blanket region is varied along the radius. In the fast breeder of this embodiment, therefore, only one kind of fuel assemblies is required for constructing the second layer II as will be fully explained later, so that the production and loading of the fuel assemblies are facilitated considerably. The internal blanket region of the first layer I is disposed adjacent to the internal blanket region of the second layer II.

In the hamburger type core of the fast breeder of this embodiment, the diameters $D_1$, $D_2$, $d_1$ and $d_2$ are selected to be 405 cm, 325 cm, 265 cm and 194 cm, respectively, while the axial thicknesses $H_1$, $H_2$, $H_3$ and $H_4$ are selected to be 175 cm, 95 cm, 22 cm and 12 cm, respectively. The height of the core region 50 is decreased by 5 cm, while the thickness of each of the axial blanket regions 4A and 4B is increased by 5 cm, respectively, as compared with the cores described hereinbefore. The core region 50 has a greater degree of enrichment of the fissile material than the core shown in FIG. 8, but the amount of loading of the fissile material in the driver core region 50 is decreased by about 3%. Namely, the amount of fissile material loaded in the driver core region of this fast breeder is about 3400 Kg.

The constructions of the fuel assemblies to be loaded in the first, second, third and fourth layers I, II, III and IV will be explained with reference to FIGS. 18A to 18D. The fuel assembly 25A to be loaded in the first layer I has a construction basically identical to the fuel pin 25 shown in FIG. 15 and employs fuel pins 26A shown in FIG. 18A as the fuel pins 26. Each of the fuel pins 26A has a clad tube 27 closed at its both ends with plugs 28 and 29 and filled with more than two kinds of fuel pellets, i.e. the core fuel pellets and blanket fuel pellets. More specifically, the fuel pin 26A has an upper blanket region 31A beneath the upper end plug 28, a driver core region 32A underlying the upper blanket region 31A, internal blanket region 33 underlying the driver core region 32A, core region 32B underlying the internal blanket region 33 and a lower blanket region 31B underlying the driver core region 32B. A gas plenum 34 for storing the gas produced as a result of the fission is defined beneath the lower blanket region 31B. The upper blanket region 31A, the internal blanket region 33 and the lower blanket region 31B are charged with blanket fuel pellets consisting of depleted uranium. The lengths of the upper blanket region 31A, internal blanket region 33 and the lower blanket region 31B are 40 cm, 22 cm and 40 cm, respectively. The driver core regions 32A and 32B are charged with core fuel pellets consisting of $PuO_2$—$UO_2$ with enriched plutonium 239. The driver core regions 32A and 32B have a common length of 36.5 cm. The length between the upper end of the upper blanket region 31A and the lower end of the lower blanket region 31B, i.e. the axial thickness $H_1$, is 17.5 cm. A wire spacer 30 is wound around and secured to the clad tube 27.

The fuel assembly 25B to be loaded in the second layer II employs fuel pins 26B as shown in FIG. 18B, as the fuel pins 26 in the fuel assembly 25 shown in FIG. 15. In the fuel pin 26B, the length of the driver core regions 35A and 35B are increased, while the length of the internal blanket region 36 is reduced, as compared with the fuel pin 26A. The driver core regions 35A and 35B are charged with core fuel pellets and have a common length of 41.5 cm, while the internal blanet region 36 is charged with blanket fuel pellets and has a length of 12 cm.

A fuel assembly 25C to be loaded in the third layer III is formed by using fuel pins 26C having a construction as shown in FIG. 18C, as the fuel pins 26 in the fuel assembly 25 shown in FIG. 15. The fuel pin 26C has only a driver core region 37 charged with core fuel pellets, between the upper and lower blanket regions 31A and 31B in the clad tube 27.

A fuel pin 26D shown in FIG. 18D has a blanket region 38 charged with the blanket fuel pellets solely, above the gas plenum 34 in the clad tube 27. The fuel assembly 25D to be loaded in the fourth layer IV is formed by using the above-mentioned fuel pins 26D as the fuel pins 26 of the fuel assembly 25 shown in FIG. 15. The fuel pins 26A, 26B, 26C and 26D have an equal length of the gas plenums 34. The length of the fuel pins is equal to that of the cores described hereinbefore. Also, driver core fuel pellets in these fuel pins have an equal degree of enrichment of plutonium 239.

Figure 19:
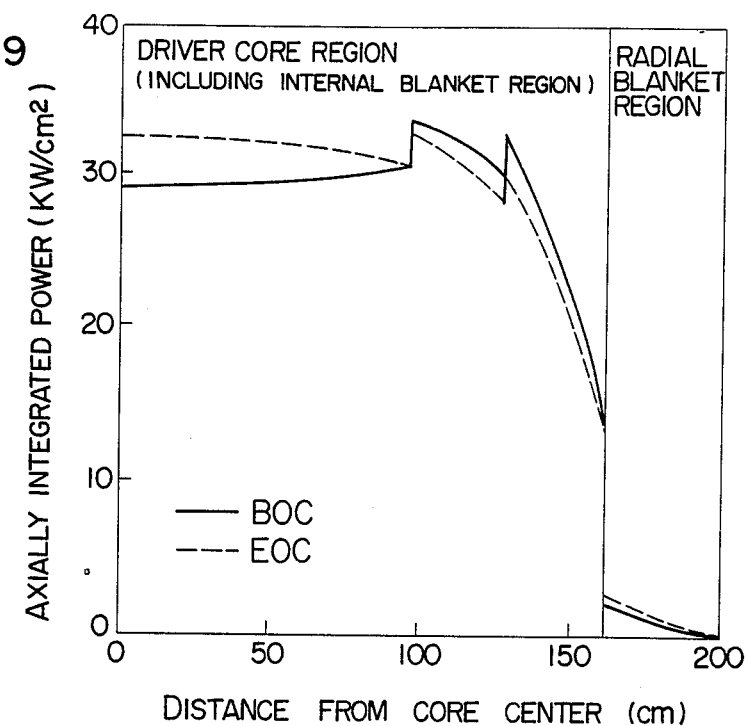
FIG. 19 is a characteristic diagram showing the radial power distribution in the hamburger type core as shown in FIG. 16.
Figure 20:
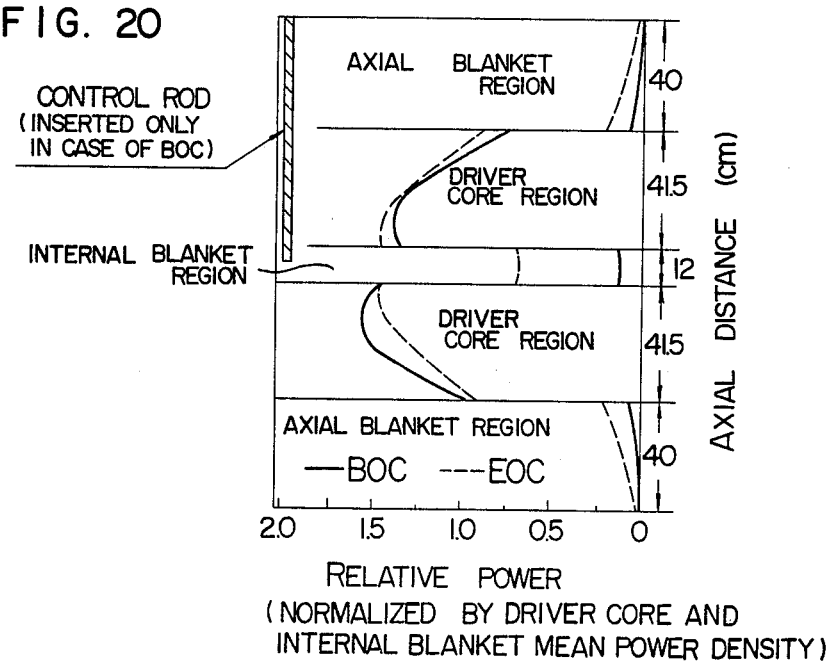
FIG. 20 is a characteristic diagram showing the axial power distribution in the hamburger type core as shown in FIG. 16.

As in the case of the hamburger type core shown in FIG. 8, the power distribution is flattened remarkably in the hamburger type core of the fast breeder of this embodiment, thanks to the presence of the second and third layers II and III. The radial and axial power distributions of this core are shown in FIGS. 19 and 20. The control rods shown in 20 are inserted into the axial center of the core from the upper side only at the time of BOC. Thereafter, the control rods are withdrawn from the core.

The hamburger type core of the fast breeder of this embodiment offers the following advantages. Namely, since the power distribution is remarkably flattened, and since the thicknesses of the axial blanket regions are increased while decreasing the thickness of the core region 50, the neutron capture reaction and fission reaction of the uranium 238 in the axial blanket regions 4A and 4B are made extremely vigorous. In consequence, a high breeding ratio of 1.29, which is 0.8% increase as compared with that in the core shown in FIG. 8, is attained. This in turn permits, in combination with the decrease in the amount of loading of the fissile material, a remarkable shortening of the doubling time down to 16.6 years, in the case of this embodiment having the size ($d_1/D_2=0.79$) mentioned before. In the hamburger type core having the ratio $d_1/D_2$ amounting to 0.81, the doubling time is 16.5 years.

What is claimed is:

1. A fast breeder incorporating a core having a driver core region containing a fissile material, an external blanket region surrounding said driver core region and containing a fertile material and an internal blanket region disposed within said driver core region and containing a fertile material, characterized in that the axial thickness of said internal blanket region is greater at the central portion of said internal blanket region than at the peripheral portion of the same, and that the outer peripheral end of the peripheral portion of said internal blanket region opposes to said external blanket region with a portion of said driver core region interposed therebetween.

2. A fast breeder as claimed in claim 1, wherein the ratio $d_1/D_2$ between the diameter $d_1$ of said internal blanket region and the diameter $D_2$ of said driver core region is determined to fall between 0.76 and 0.90.

3. A fast breeder as claimed in claim 1 or 2, wherein said fissile material in said driver core region has a uniform degree of enrichment.

4. A fast breeder as claimed in claim 1 or 2, wherein the axial thicknesses of the portions of said internal blanket region of greater and smaller axial thicknesses are constant.

5. A fast breeder incorporating a core having a driver core region containing a fissile material, an external blanket region surrounding said driver core region and containing a fertile material, and an internal blanket region disposed within said driver core region and containing a fertile material, characterized in that said internal blanket region and said driver core region are constituted by a first zone in which an internal blanket region containing a fertile material is disposed between axially spaced upper and lower driver core regions containing a fissile material, a second zone surrounding said first zone, said second zone having an internal blanket region having an axial thickness smaller than that of said internal blanket region in said first zone and disposed between axially spaced upper and lower driver core regions containing a fissile material, and a third zone surrounding said second zone and having only a driver core region containing a fissile material but having no internal blanket region.

6. A fast breeder as claimed in claim 5, wherein the ratio $d_1/D_2$ between the diameter $d_1$ of said second zone and the diameter $D_2$ of said third zone is determined to fall between 0.76 and 0.9.

7. A fast breeder as claimed in claim 5 or 6, wherein said first, second and third zones have an equal degree of enrichment of said fissile material.

8. A fast breeder as claimed in claim 7, wherein said internal blanket regions in said first and second zones have constant axial thicknesses along the radius of said core.

9. A fast breeder incorporating a core having a plurality of first fuel assemblies each of which including external blanket regions provided at the axially upper and lower ends thereof and containing a fertile material, an upper and lower driver core regions disposed between said external blanket regions and containing a fissile material and an internal blanket region disposed between said upper and lower driver core regions and containing a fertile material, and a plurality of fourth fuel assemblies each of which having said external blanket region but no driver core region, characterized in that it comprises: a plurality of second fuel assemblies constituting a second zone which surrounds a first zone constituted by said first fuel assemblies, each of said second fuel assemblies having an identical arrangement of said external blanket regions, driver core regions and said internal blanket region to that of said first fuel assembly, said internal blanket region of said second fuel assembly having an axial thickness smaller that that of said internal blanket region of said first fuel assembly; and a plurality of third fuel assemblies constituting a third zone surrounding said second zone, each of said third fuel assemblies having said external blanket regions provided at axially upper and lower ends thereof and said driver core 10. A fast breeder as claimed in claim 9, wherein the ratio $d_1/D_2$ between the diameter $d_1$ of said second zone and the diameter $D_2$ of said third zone is determined to fall between 0.76 and 0.9.

11. A fast breeder as claimed in claim 9 or 10, wherein said first, second and third zones have an equal degree of enrichment of said fissile material.

12. A fast breeder as claimed in claim 11, wherein all of said first fuel assemblies constituting said first zone have an equal axial height of said internal blanket regions, and all of said second fuel assemblies constituting said second zone have an equal axial height of said internal blanket regions.

13. A fast breeder as claimed in claim 1, wherein the axial thickness of the central portion of said internal blanket region is of a constant thickness and the axial thickness of said internal blanket region varies between the central portion and the outer peripheral end of said internal blanket region.

14. A fast breeder as claimed in claim 13, wherein the axial thickness of said internal blanket region varies in a stepped manner between the central region and the outer peripheral end thereof.

* * * * *